(12) United States Patent
Okamoto

(10) Patent No.: US 6,304,401 B1
(45) Date of Patent: Oct. 16, 2001

(54) MAGNETIC REPRODUCING APPARATUS THAT LIMITS DISTORTION OF AN OUTPUT SIGNAL WITH INCREASED AMPLIFICATION

(75) Inventor: Yujiro Okamoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/359,794

(22) Filed: Jul. 26, 1999

(30) Foreign Application Priority Data

Jul. 30, 1998 (JP) .................................................. 10-215539

(51) Int. Cl.$^7$ ................................ G11B 5/03; G11B 5/02; G11B 5/09
(52) U.S. Cl. ................................ 360/66; 360/25; 360/46; 360/67
(58) Field of Search .................................. 360/46, 66, 67, 360/25; 330/252, 259, 290, 136; 327/52, 53

(56) References Cited

U.S. PATENT DOCUMENTS 6,111,711 * 8/2000 Barber et al. ........................... 360/46

* cited by examiner

*Primary Examiner*—Regina Y. Neal
(74) *Attorney, Agent, or Firm*—Arent Fox Kintner Plotkin and Kahn, PLLC

(57) ABSTRACT

A magnetic reproducing apparatus uses a magnetic head to read data recorded on a magnetic recording medium. The signal reproduced by the magnetic head is, in a reading circuit, amplified by an amplifier circuit. A compensation circuit compares the bias voltage across the magnetic head with a reference voltage to detect variation in the bias voltage and compensates for the variation in accordance with the detection result. In the magnetic reproducing apparatus, the amplification factor of the amplifier circuit is set by a control signal fed in via a single switching terminal, and the reference voltage is set in a manner interlocked therewith.

8 Claims, 4 Drawing Sheets

MAGNETIC REPRODUCING APPARATUS THAT LIMITS DISTORTION OF AN OUTPUT SIGNAL WITH INCREASED AMPLIFICATION

BACKGROUND OF THE INVENTION

1. Field of the Invention

The present invention relates to a magnetic reproducing apparatus such as a floppy disk drive or hard disk drive.

2. Description of the Prior Art

A conventional magnetic reproducing apparatus will be described. FIG. 3 is a circuit diagram of a reading circuit 40 in a conventional magnetic reproducing apparatus. In FIG. 3, a magnetic head 2 reads data recorded on a magnetic disk such as a floppy disk or hard disk. The two ends of the magnetic head are connected to terminals 22 and 23 of the reading circuit 40, so that the signal reproduced by the magnetic head 2 is fed to the reading circuit 40. The terminals 22 and 23 are connected to a preamplifier 24 and to an input bias setting circuit 34, respectively. The preamplifier 24 amplifies, on a differential basis, the reproduced signal fed to the terminals 22 and 23.

The preamplifier 24 outputs two amplified reproduced signals, of which one is fed to the base of an npn-type transistor Q1 and of which the other is fed to the base of an npn-type transistor Q2. The collector of the transistor Q1 is connected through a resistor R1 to a supplied voltage Vcc, and the collector of the transistor Q2 is connected through a resistor R2 to the supplied voltage Vcc.

Between the emitters of the transistors Q1 and Q2, a resistor R3 is connected. In addition, in parallel with the resistor R3, a circuit having a resistor R4 and a switch SW1 connected in series is connected. Switching of the switch SW1 is controlled by a control signal fed in via a terminal 43. Between the emitter of the transistor Q1 and ground, a constant current source circuit 25 is connected. Between the emitter of the transistor Q2 and ground, a constant current source circuit 26 is connected. The transistors Q1 and Q2, the resistors R1, R2, and R3, the serial circuit composed of the resistor R4 and the switch SW1, and the constant current source circuits 25 and 26 together constitute a differential amplifier circuit 38.

The collector of the transistor Q1 is connected to the base of an npn-type transistor Q3. The collector of the transistor Q2 is connected to the base of an npn-type transistor Q4. The collector of the transistor Q3 is connected to the supplied voltage Vcc. The collector of the transistor Q4 is connected to the supplied voltage Vcc. Between the emitter of the transistor Q3 and ground, a constant current source circuit 27 is connected. Between the emitter of the transistor Q4 and ground, a constant current source circuit 28 is connected. The emitter of the transistor Q3 is connected to an output terminal 35. The emitter of the transistor Q4 is connected to an output terminal 36.

The amplified reproduced signal output from the preamplifier 24 are further amplified on a differential basis by a differential amplifier circuit 41 that produces a single output. The output of this differential amplifier circuit 41 is fed to one input terminal of a comparator 42. To the other input terminal of the comparator 42, a reference voltage Va is fed. The comparator 42 compares the output of the differential amplifier circuit 41 with the reference voltage Va, and feeds the comparison result to the input bias setting circuit 34. The differential amplifier circuit 41, the comparator 42, and the input bias setting circuit 34 together constitute a thermal asperity circuit 50.

This conventional magnetic reproducing apparatus operates in the following manner. The signal reproduced by the magnetic head 2 is first amplified by the preamplifier 24 and is then fed to the differential amplifier circuit 38. The amplification factor of the differential amplifier circuit 38 depends on the state of the switch SW1. Specifically, when the switch SW1 is on, the resistors R3 and R4 are kept connected in parallel, and thus offer a smaller composite resistance. This reduces the resistance present on the emitter side of the transistors Q1 and Q2, and thus increases the amplification factor of the differential amplifier circuit 38. By contrast, when the switch SW1 is off, the resistor R4 is disconnected from the rest of the circuitry. This increases the resistance present on the emitter side of the transistors Q1 and Q2, and thus reduces the amplification factor of the differential amplifier circuit 38. Note that switching of the switch SW1 is performed in accordance with the resistance of the magnetic head 2 and the level of the read signal.

Thus, the amplification factor of the differential amplifier circuit 38 is switched by the control signal fed in via the terminal 43. The amplified reproduced signals are extracted from the collectors of the transistors Q1 and Q2, and are then fed through the transistors Q3 and Q4, provided as a final stage, to the output terminals 35 and 36 respectively for output.

In a case where the magnetic head 2 is, for example, a magnetic head provided with a magnetic resistance device (hereafter referred to as an "MR head"), the MR head 2 exhibits a higher equivalent resistance as it generates heat from contact with the magnetic disk. As the resistance of the MR head 2 increases, the bias voltage produced across that resistance by the current i output from the input bias setting circuit 34 increases accordingly.

The thermal asperity circuit (compensation circuit) 50, by monitoring this bias voltage, compensates for variation in the bias voltage so as to keep it stably at a constant voltage. In the thermal asperity circuit 50, the signal output from the preamplifier 24 is amplified by the differential amplifier circuit 41, and the resulting output is compared with the reference voltage Va by the comparator 42. The comparator 42 feeds the comparison result, either a high level or a low level, to the input bias setting circuit 34. The input bias setting circuit 34 is controlled by the output of the comparator 42 in such a way as to reduce the current i it feeds to the magnetic head 2 and thereby reduce the bias voltage across the magnetic head 2 when the bias voltage becomes higher than the reference voltage specified by the reference voltage Va.

In the differential amplifier circuit 38, the base bias of the transistor Q1 is as indicated by B1 in FIG. 4A, and the base bias of the transistor Q2 is as indicated by B2 in FIG. 4A. An increase in the bias voltage resulting from an increase in the resistance of the magnetic head 2 causes an increase in the voltage difference W (bias) between those base biases B1 and B2 as a result of, for example, B2 shifting upward and B1 shifting downward (B2 may remain fixed). However, the above-described thermal asperity circuit 50 acts to keep the bias constant, and therefore the base biases B1 and B2 can safely be regarded as kept substantially fixed.

However, this conventional magnetic reproducing apparatus tends to suffer from distortion that appears in the output signal when the switch SW1 is turned on to increase the amplification factor of the differential amplifier circuit 38. Specifically, whereas no problem arises as long as the reproduced signals S1 and S2 remain relatively small throughout as shown in FIG. 4A, when the signals S1 and S2 have large portions, they may go out of the dynamic range into the saturation region as shown in FIG. 4B when the amplification factor of the differential amplifier circuit 38 is increased. This causes distortion in the output signal.

SUMMARY OF THE INVENTION

An object of the present invention is to provide a magnetic reproducing apparatus in which no distortion appears in the output signal when the amplification factor of a differential amplifier circuit is increased.

To achieve the above object, according to the present invention, a magnetic reproducing apparatus provided with a magnetic head for reading data recorded on a magnetic recording medium, an amplifier circuit for amplifying the reproduction signal reproduced by the magnetic head, comparing means for comparing the bias voltage across the magnetic head with a reference voltage, a compensation circuit for compensating the bias voltage in accordance with the result of comparison by the comparing means, and switching means for switching the amplification factor of the amplifier circuit is further provided with shifting means for shifting the bias voltage in a direction in which the bias voltage becomes lower when the amplification factor of the amplifier circuit is increased.

When the amplification factor of the amplifier circuit is increased, the signal being processed goes out of the dynamic range of the amplifier circuit into, for example, the saturation region, and this causes distortion. However, according to the above circuit configuration, it is possible to reduce the bias voltage and thereby shift the operating point of the amplifier circuit. This helps prevent the signal from reaching the saturation region and thereby eliminate distortion.

Moreover, in the above circuit configuration, shifting of the bias voltage may be achieved by switching the reference voltage. Furthermore, switching of the amplification factor of the amplifier circuit and switching of the reference voltage may be achieved by a control signal fed to a single terminal. Moreover, the reference voltage may be so controlled as to be reduced when the amplification factor is increased and increased when the amplification factor is reduced.

Moreover, in the above circuit configuration, an MR head may be used as the magnetic head. According to this circuit configuration, even when the MR head exhibits a higher equivalent resistance as it generates heat from contact with the magnetic disk, causing variation in the bias voltage, the compensation circuit compensates the bias voltage for such variation.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
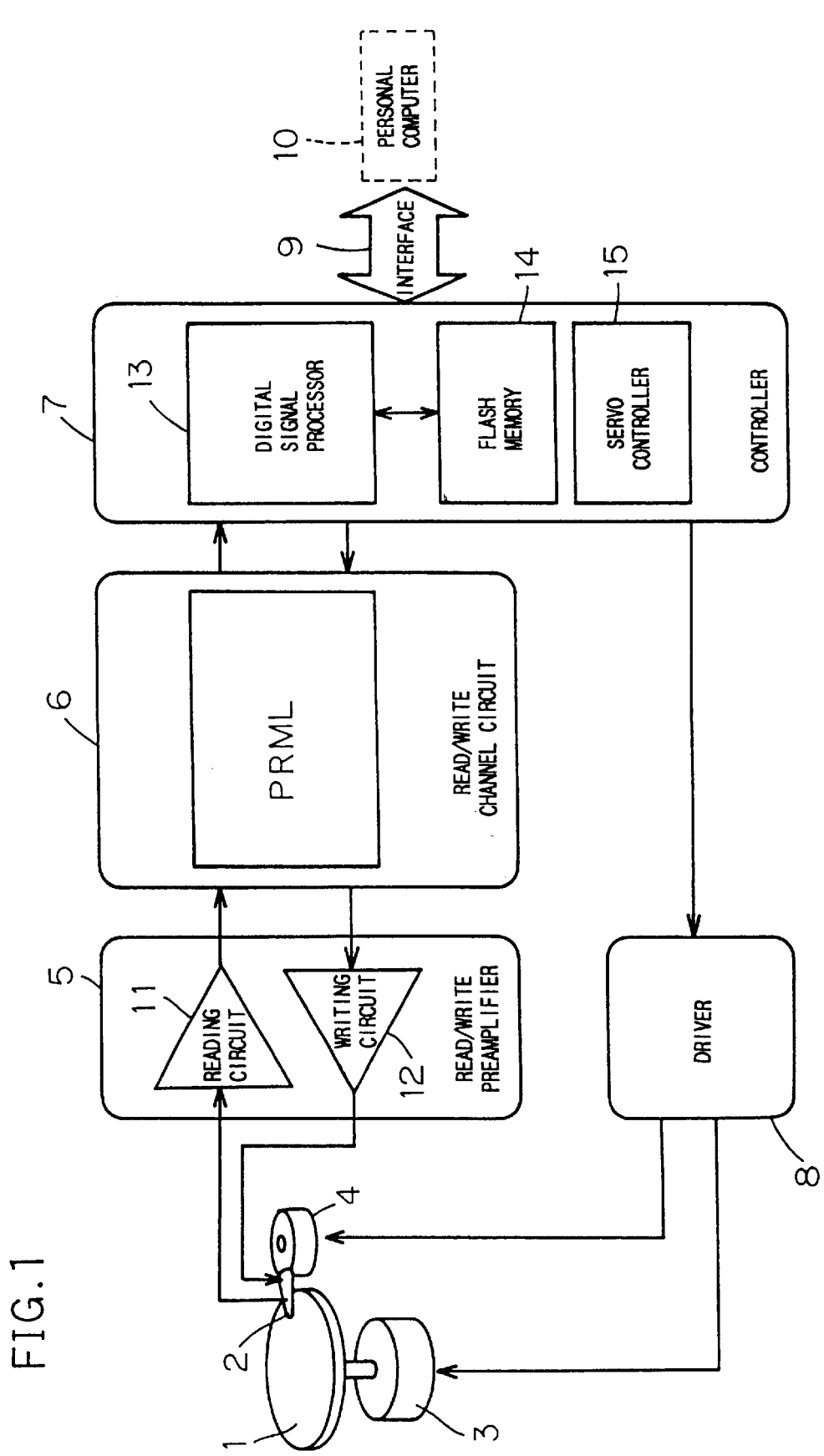
FIG. 1 is a block diagram of a magnetic reproducing apparatus embodying the invention.

Hereinafter, an embodiment of the present invention will be described. FIG. 1 is a block diagram of a magnetic reproducing apparatus embodying the invention. A magnetic disk 1 is a hard disk, floppy disk, or the like. A magnetic head 2 reads data recorded on the magnetic disk 1, and writes data to the magnetic disk 1 by using a current fed from a read/write preamplifier 5. In this embodiment, an MR head is used as the magnetic head 2.

A spindle motor 3 is a motor for rotating the magnetic disk 1. A voice control motor 4 is a motor for adjusting the tracking of the magnetic head 2. The read/write preamplifier 5 is connected to the magnetic head 2, and is composed of a reading circuit 11 for amplifying the signal reproduced by the magnetic head 2 and a writing circuit 12 for amplifying the write signal to be fed to the magnetic head 2.

A read/write channel circuit 6 performs processing such as error correction on the reproduced signal fed from the read/write preamplifier 5, and feeds the read/write preamplifier 5 with the signal to be written. In addition, the read/write channel circuit 6 performs PRML (partial response maximum likelihood) signal processing.

A controller 7 is composed of a digital signal processor 13, a flash memory 14, and a servo controller 15. The digital signal processor 13 controls reading and writing operation of the magnetic reproducing apparatus. The flash memory 14, which may be omitted in some magnetic reproducing apparatuses, is provided to allow storage of defective addresses of the magnetic disk 1 under the control of the digital signal processor 13 so as to prevent access to those addresses by the magnetic reproducing apparatus.

The servo controller 15 controls a driver 8 automatically in accordance with the settings made in advance by the digital signal processor 13, and feeds a control signal to the driver 8 for that purpose. The driver 8 has a driver for driving the spindle motor 3 and a driver for driving the voice control motor 4. The controller 7 is connected through an interface 9 to a personal computer 10.

Figure 2:
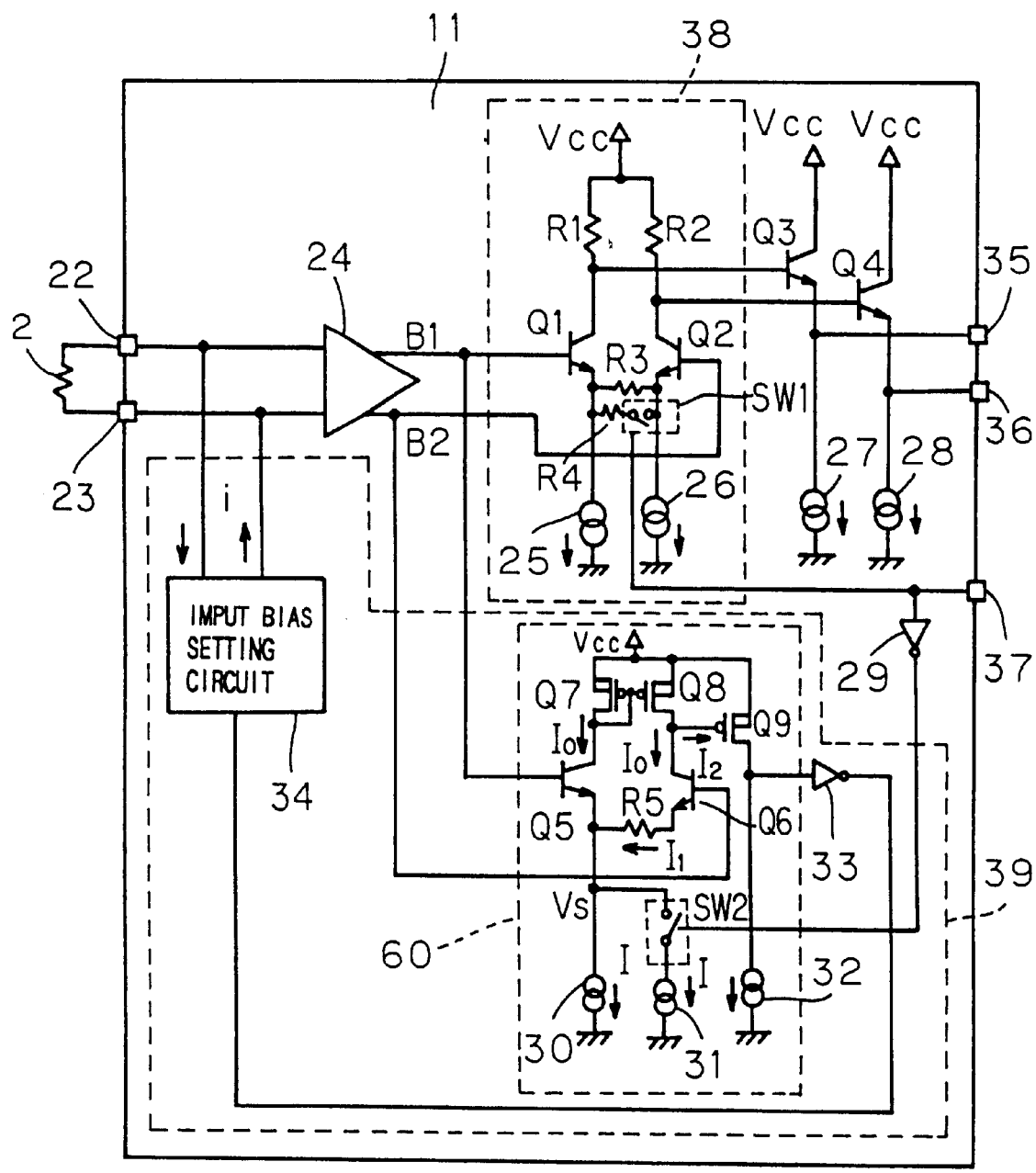
FIG. 2 is a circuit diagram of the reading circuit employed in the magnetic reproducing apparatus of the embodiment.

Next, the reading circuit 11 of this magnetic reproducing apparatus will be described in detail. The reading circuit 11 is formed as an integrated circuit. FIG. 2 is a circuit diagram showing the internal configuration of the reading circuit 11. The magnetic head 2 is an MR head, with its two ends connected to terminals 22 and 23 of the reading circuit 11. Thus, the signal reproduced by the magnetic head 2 is fed to the reading circuit 11. A preamplifier 24 amplifies the reproduced signal on a differential basis.

Figure 3:
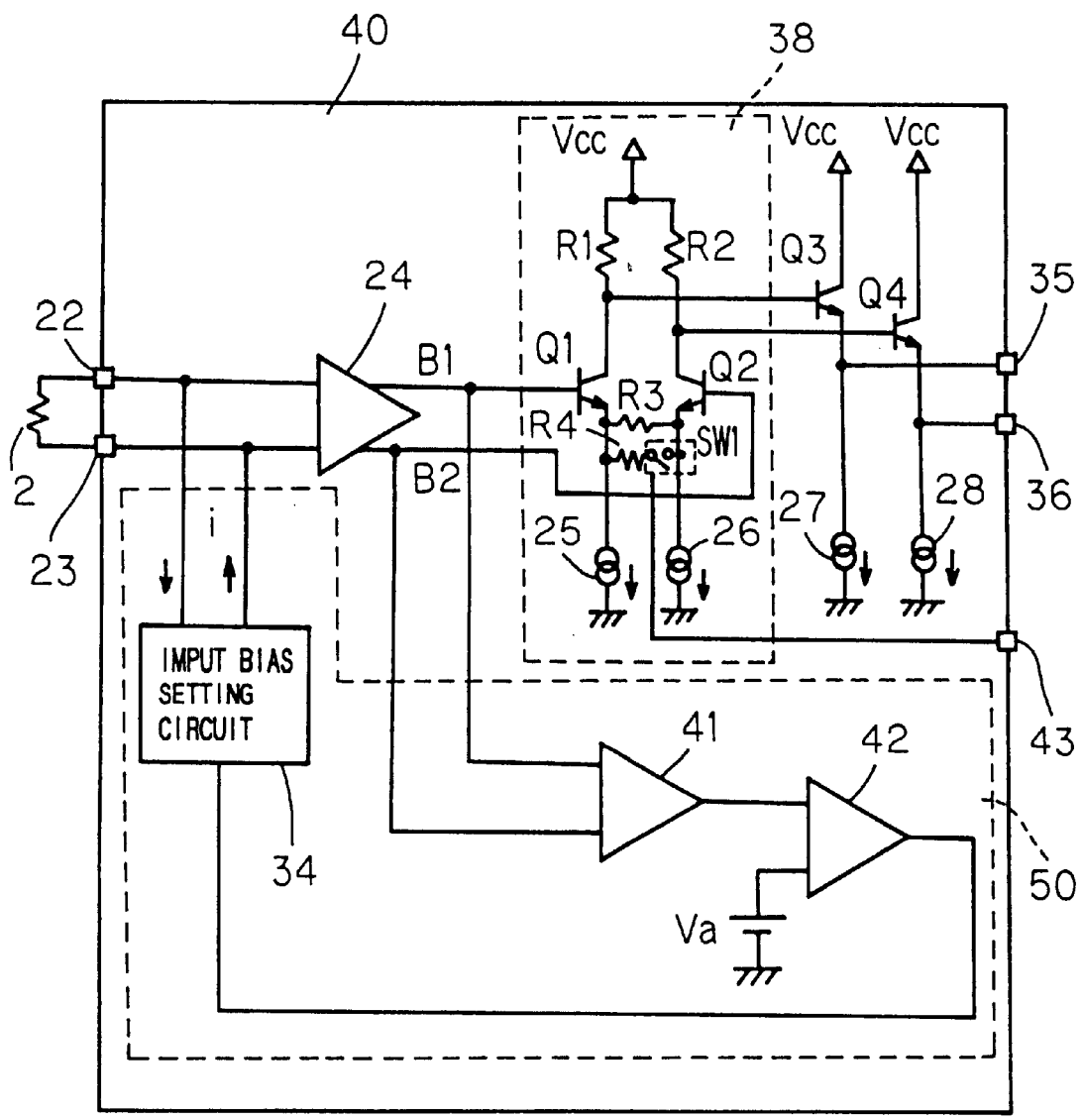
FIG. 3 is a circuit diagram of the reading circuit employed in a conventional magnetic reproducing apparatus.

The reproduced signal amplified by the preamplifier 24 is further amplified by a differential amplifier circuit 38 in the following stage. The differential amplifier circuit 38 has the same configuration as the differential amplifier circuit 38 in the conventional magnetic reproducing apparatus (FIG. 3) described earlier. In FIG. 2, such elements as are found also in FIG. 3 are identified with the same reference numerals. The differential amplifier circuit 38 has a switch SW1 whose switching is controlled by a control signal fed in via a switching terminal 37. As described earlier, the amplification factor of the differential amplifier circuit 38 is increased when the switch SW1 is turned on and is reduced when the switch SW1 is turned off.

The differential amplifier circuit 38 outputs two amplified reproduced signals, of which one is fed to the base of the npn-type transistor Q3 provided as an output transistor and of which the other is fed to the base of the npn-type transistor Q4 provided as an output transistor. The collector of the transistor Q3 is connected to a supplied voltage Vcc. Between the emitter of the transistor Q3 and ground, a constant current source circuit 27 is connected.

Similarly, the collector of the transistor Q4 is connected to the supplied voltage Vcc. Between the emitter of the transistor Q4 and ground, a constant current source circuit 28 is connected. The emitter of the transistor Q3 is connected to an output terminal 35. The emitter of the transistor Q4 is connected to an output terminal 36.

The reading circuit 11 is provided with a thermal asperity circuit (compensation circuit) 39 for compensating for variation in the bias voltage applied to the magnetic head 2. The output of the preamplifier 24 is fed also to a bias monitoring circuit 60, which produces a single output, provided within the thermal asperity circuit 39. When the bias voltage across the magnetic head 2 becomes higher than a predetermined voltage (monitoring reference voltage), the bias monitoring circuit 60 outputs a bias control signal, in response to which the bias is reduced. The bias control signal is fed to an input bias setting circuit 34. As will be described later, the differential amplifier circuit 38 additionally includes an arrangement for switching the monitoring reference voltage. This switching is performed in a manner interlocked with switching of the gain of the differential amplifier circuit 38.

The bias monitoring circuit 60 compares the voltage difference between the two signals B1 and B2 output from the preamplifier 24 with the monitoring reference voltage Va described later. The signal B1 is fed to the base of an npn-type transistor Q5, and the signal B2 is fed to the base of an npn-type transistor Q6. Note that, within the bias monitoring circuit 60, only the bias voltage (direct-current components) included in the signals B1 and B2 is relevant; accordingly, although the signals B1 and B2 include, in addition to the bias voltage, also the reproduced signal (alternating-current components), they are regarded as direct-current signals in the description related to the bias monitoring circuit 60. Note also that B1<B2.

The collector of the transistor Q5 is connected to the drain and gate of a p-channel MOS (metal-oxide semiconductor) transistor Q7. The source of the transistor Q7 is connected to the supplied voltage Vcc. The gate of the transistor Q7 is connected to the gate of a p-channel MOS transistor Q8. The source of the transistor Q8 is connected to the supplied voltage Vcc. The drain of the transistor Q8 and the collector of the transistor Q6 are connected together. The transistors Q7 and Q8 constitute a current mirror circuit.

Between the emitters of the transistors Q5 and Q6, a resistor R5 is connected so that the voltage appearing across it is used as a monitoring reference voltage. Between the emitter of the transistor Q5 and ground, a constant current source circuit 30 is connected. In parallel with the constant current source circuit 30, a circuit having a switch SW2 and a constant current source circuit 31 connected in series is connected. The constant current source circuits 30 and 31 each output a constant current I.

Switching of the switch SW2 is controlled by a signal obtained by inverting by means of an inverter 29 the switching signal fed in via the switching terminal 37. The collector of the transistor Q6 is connected to the gate of a p-channel MOS transistor Q9. The source of the transistor Q9 is connected to the supplied voltage Vcc. Between the drain of the transistor Q9 and ground, a constant current source circuit 32 is connected.

The drain of the transistor Q9 is connected through an inverter 33 to the input bias setting circuit 34. When the result of monitoring by the bias monitoring circuit 60 indicates that the bias voltage across the magnetic head 2 is higher than the monitoring reference voltage, the input bias setting circuit 34 reduces the current i fed to the magnetic head 2 and thereby reduces the bias voltage.

To the switching terminal 37, a switching signal (control signal) is fed that is either at a low level or at a high level at a time. When the switching signal is at a high level, the switch SW1 is turned on. At this time, the switch SW2 is fed with a low level through the inverter 29, and is thus turned off. By contrast, when the switching signal fed to the switching terminal 37 is at a low level, the switch SWi is turned off, and the switch SW2 is turned on.

The bias monitoring circuit 60 compares the voltage difference between the signals B1 and B2 with the monitoring reference voltage and outputs a comparison result. The monitoring reference voltage is produced by the constant current source circuits 30 and 31 and the resistor R5, as will be described later. The monitoring reference voltage is determined in the following manner. The transistors Q7 and Q8 constitute a current mirror circuit, and thus output an equal current $I_0$. When the switch SW2 is off, the following equations hold with respect to currents:

$$I_0+I_1=I \tag{1}$$

$$I_0=Is \cdot exp(qV_{BE1}/kT) \tag{2}$$

$$I_1=Is \cdot exp(qV_{BE2}/kT) \tag{3}$$

Here, Is represents the base-emitter saturation current of the transistors Q5 and Q6, and is assumed to be equal between Q5 and Q6. Moreover, q represents the electric charge carried by an electron; k represents Boltzman's constant; T represents the absolute temperature. Furthermore, $V_{BE1}$ represents the baseemitter voltage of the transistor Q5, and $V_{BE2}$ represents the base-emitter voltage of the transistor Q6.

On the other hand, the following equations hold with respect to voltages:

$$B1=V_{BE1}+VS \tag{4}$$

$$B2=V_{BE2}+Va+Vs \tag{5}$$

Here, Vs represents the emitter voltage of the transistor Q5.

Now, suppose that a current $I_2$ flows toward the gate of the MOS transistor Q9, then, according to equations (1) to (5), the current $I_2$ is determined as:

$$I_2=I_0-I_1=Is \cdot exp(-qVs/kT) \cdot exp(q \cdot B1/kT)-exp(q(B2-(I-I_0)R5)/kT)) \tag{6}$$

The sign of the current $I_2$ is determined by the sign of B1−B2+(I−$I_0$) R5. The sign of the current $I_2$ indicates the result of comparison of the voltage difference B2−B1 between the signals B2 and B1 with the monitoring reference voltage Va=(I−$I_0$) R5. When B2−B1 is lower than the monitoring reference voltage Va, the current $I_2$ takes a positive sign. In the real circuit, a current flows through the gate capacitance of the MOS transistor Q9, and this makes the gate of the MOS transistor Q9 turn to a high level. As a result, the MOS transistor Q9 is turned on. By contrast, when B2−B1 is higher than the monitoring reference voltage Va, the current $I_2$ takes a negative sign, and thus the gate of the MOS transistor Q9 turns to a low level. As a result, the MOS transistor Q9 is turned off, When the switch SW2 is on, the constant current source circuit 31 acts to increase the current I in equation (6) to 2I, making the monitoring reference voltage Va equal to $(21-I_0)$. Accordingly, turning the switch SW2 on results in making the monitoring reference voltage higher.

In this way, when the voltage difference between the signals B1 and B2 is lower than the monitoring reference voltage, the MOS transistor Q9 is turned on. As a result, a high level is fed to the inverter 33, causing the inverter 33 to output a low level. When the bias voltage rises and makes the voltage difference between the signals B1 and B2 higher than the monitoring reference voltage, the gate of the MOS transistor Q9 turns to a low level. As a result, the MOS transistor Q9 is turned off. Thus, a low level is fed to the inverter 33, causing the inverter 33 to output a high level.

When the output of the inverter 33 is at a low level, the input bias setting circuit 34 increases the current it outputs so as to increase the bias voltage. By contrast, when the output of the inverter 33 is at a high level, the input bias setting circuit 34 reduces the current it outputs so as to reduce the bias voltage When the switching signal is at a high level, the switch SW1 is turned on, and the amplification factor of the differential amplifier circuit 38 is increased. At this time, the switch SW2 is turned off, and thus the monitoring reference voltage Va is reduced. As the monitoring reference voltage Va is reduced, the bias voltage is reduced. By contrast, when the switching signal is at a low level, the switch SW1 is turned off, and the amplification factor of the differential amplifier circuit 38 is reduced. At this time, the switch SW2 is turned on, and thus the monitoring reference voltage Va is increased, with the result that the bias voltage is increased.

Figure 4A:
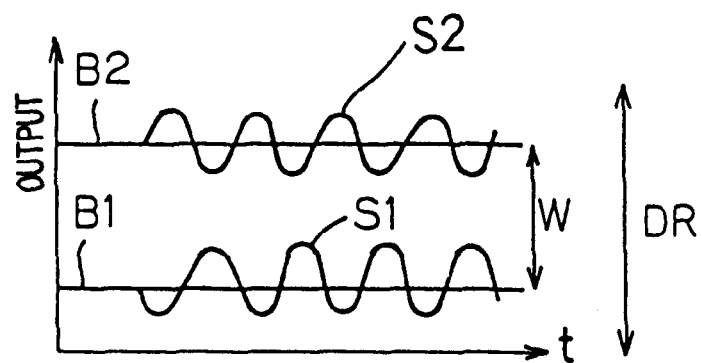
FIGS. 4A to 4C are diagrams illustrating the operation of a differential amplifier circuit employed in the conventional magnetic reproducing apparatus and in the magnetic reproducing apparatus of the embodiment.
Figure 4B:
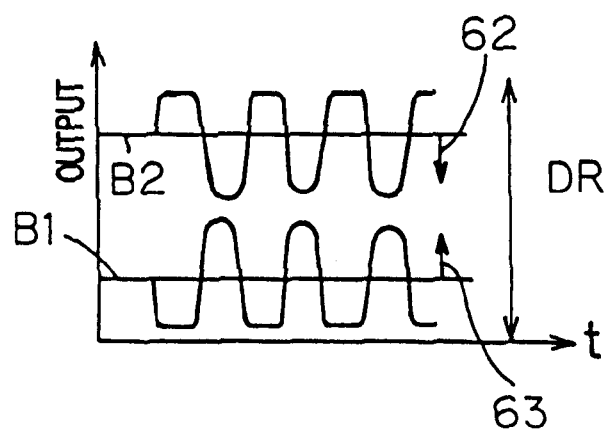
Figure 4C:
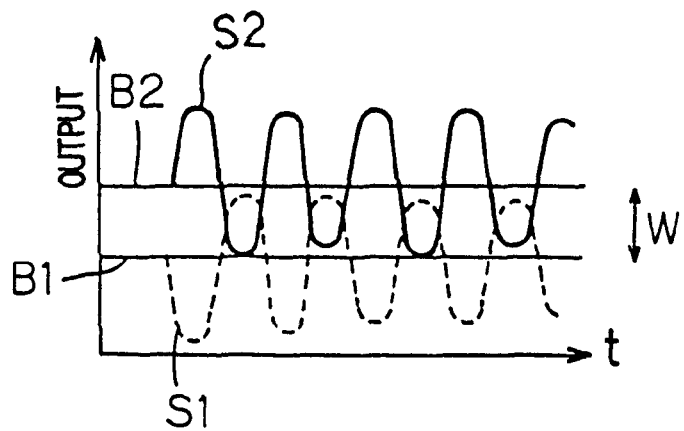

As described above, in this embodiment, when the amplification factor of the differential amplifier circuit 38 is increased, the monitoring reference voltage is reduced; that is, as shown in FIG. 4C, the voltage difference between B1 and B2, i.e. the bias voltage W, becomes smaller. As a result, the operating point of the transistors Q1 and Q2 shifts toward the center of the dynamic range, and this accordingly reduces the possibility of the signals S1 and S2 going out of the dynamic range. Thus, the reproduced signal is less likely to suffer distortion. Note that, when the amplification factor of the differential amplifier circuit 38 is reduced, the bias voltage is as shown in FIG. 4A.

Moreover, in this embodiment, it is possible to switch the amplification factor of the differential amplifier circuit 38 and the monitoring reference voltage used by the thermal asperity circuit 39 in an interlocked manner in accordance with the control signal fed to a single switching terminal 37. As a result, in this embodiment, where the switches SW1 and SW2 are controlled in an interlocked manner, there is no possibility of, for example, increasing both the amplification factor and the monitoring reference voltage by mistake as may occur in a configuration having separate switching terminals for switching the amplification factor of the differential amplifier circuit 38 and for switching the monitoring reference voltage used by the bias monitoring circuit 60. Moreover, by allowing the amplification factor of the differential amplifier circuit 38 and the monitoring reference voltage used by the thermal asperity circuit 39 to be switched in accordance with the control signal fed to a single switching terminal 37, it is possible to minimize the number of input terminals of the reading circuit 11, and thus the circuit scale thereof.

In this embodiment, the input bias setting circuit 34 compensates the bias voltage in accordance with a binary signal, i.e. a signal that is either at a high level or at a low level at a time, obtained from the bias monitoring circuit 60 through the inverter 33 as indicating the result of comparison of the bias voltage with the monitoring reference voltage. However, it is also possible to set the bias voltage in accordance with a continuous monitoring signal (analog signal). In this embodiment, bipolar transistors are used as the transistors Q5 and Q6 to obtain higher accuracy. However, it is also possible to use MOS transistors in their place.

What is claimed is:

1. A magnetic reproducing apparatus comprising:

a magnetic head for reading data recorded on a magnetic recording medium;

an amplifier circuit for amplifying a reproduction signal reproduced by the magnetic head;

comparing means for comparing a bias voltage across the magnetic head with a reference voltage;

a compensation circuit for compensating the bias voltage in accordance with a result of comparison by the comparing means;

switching means for switching an amplification factor of the amplifier circuit; and shifting means for shifting the bias voltage in a direction in which the bias voltage becomes lower when the amplification factor of the amplifier circuit is increased;

wherein switching of the amplification factor of the amplifier circuit and switching of the reference voltage are achieved by a control signal fed to a single terminal.

2. A magnetic reproducing apparatus as claimed in claim 1, wherein shifting of the bias voltage is achieved by switching the reference voltage.

3. A magnetic reproducing apparatus as claimed in claim 1, wherein, when the amplification factor is increased, the reference voltage is reduced and, when the amplification factor is reduced, the reference voltage is increased.

4. A magnetic reproducing apparatus as claimed in claim 1, wherein the magnetic head is an MR head.

5. A magnetic reproducing apparatus comprising:

a magnetic head for reading data recorded on a magnetic recording medium;

a bias circuit for feeding a bias current to he magnetic head;

a differential amplifier circuit to which a signal reproduced by the magnetic head and a bias voltage appearing across the magnetic head are fed;

a gain switching circuit for switching a gain of the differential amplifier circuit;

a compensation circuit for comparing the bias voltage from the magnetic head with a reference voltage to detect variation in the bias voltage and then controlling the bias circuit in accordance with a result of comparison to compensate for the variation in the bias voltage; and shifting means for shifting the bias voltage in a direction in which the bias voltage becomes lower by reducing the bias current fed from the bias circuit when the gain is switched so as to become higher;

wherein switching of the gain of the differential amplifier circuit and switching of the reference voltage are achieved by a control signal fed to a single terminal.

6. A magnetic reproducing apparatus as claimed in claim 5, wherein the compensation circuit comprises:

a first transistor to which the bias voltage is fed from one end of the magnetic head;

a second transistor to which the bias voltage is fed from another end of the magnetic head;

a resistor of which one end is connected to an emitter of the first transistor and of which another end is connected to an emitter of the second transistor;

a constant current source circuit connected to the emitter of the first transistor;

a current mirror circuit of which an input side is connected to a collector of the first transistor and of which an output side is connected to a collector of the second transistor; and a third transistor of which an input electrode is connected to the collector of the second transistor and of which an output electrode is connected to the bias circuit.

7. A magnetic reproducing apparatus as claimed in claim 6, wherein an output current of the constant current source circuit is switched according as the gain of the differential amplifier circuit is switched.

8. A magnetic reproducing apparatus as claimed in claim 5, wherein the magnetic head is an MR head.

* * * * *